4 Sheets—Sheet 1.
A. A. RHEUTAN,
Assignor to W. H. HILL.
Envelope Machine.
No. 9,755. Reissued June 14, 1881.
Fig. 1,
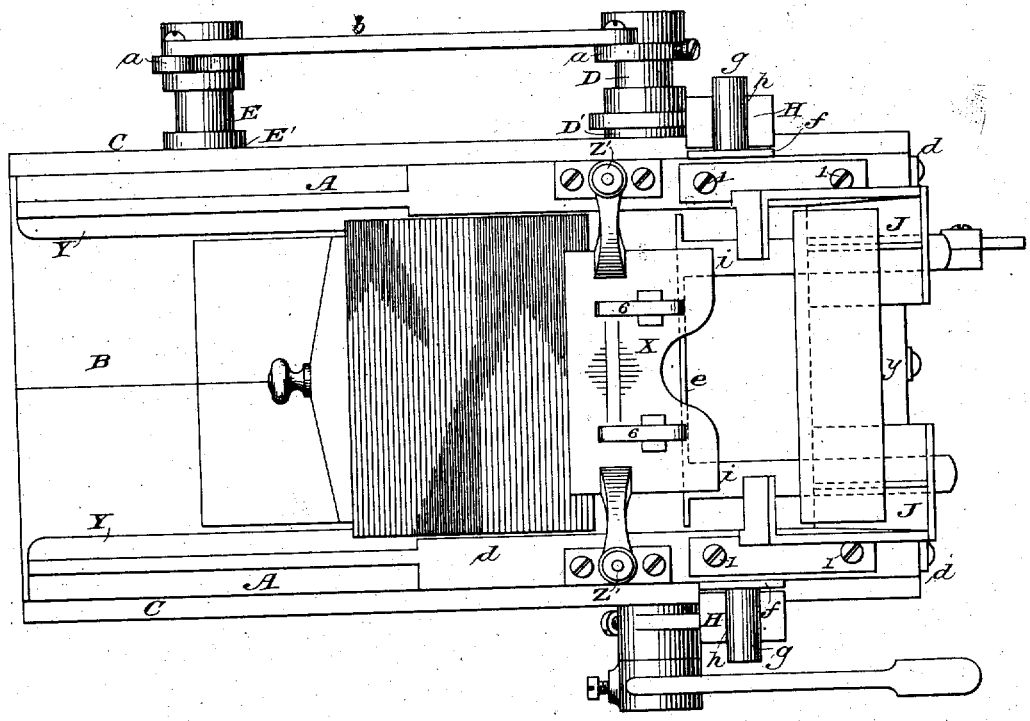
Fig. 5,
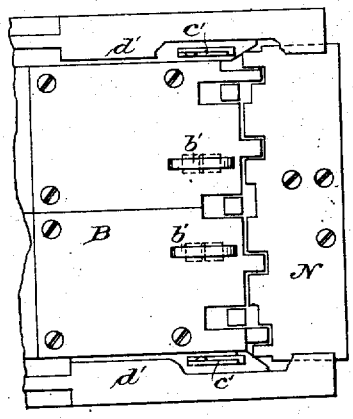
WITNESSES
Wm. A. Skinkle.
Geo. W. Breck.
INVENTOR
Abram A. Rheutan
By his Attorneys
Baldwin, Hopkins, & Peyton

A. A. RHEUTAN,

Assignor to W. H. HILL.

Envelope Machine.

No. 9,755. Reissued June 14, 1881.

WITNESSES

Wm. A. Skinkle

Geo. W. Beck.

INVENTOR

Abram A. Rheutan,

By his Attorneys

Baldwin, Hopkins & Peyton.

A. A. RHEUTAN,
Assignor to W. H. HILL.
Envelope Machine.
No. 9,755. Reissued June 14, 1881.
*Fig. 3,*
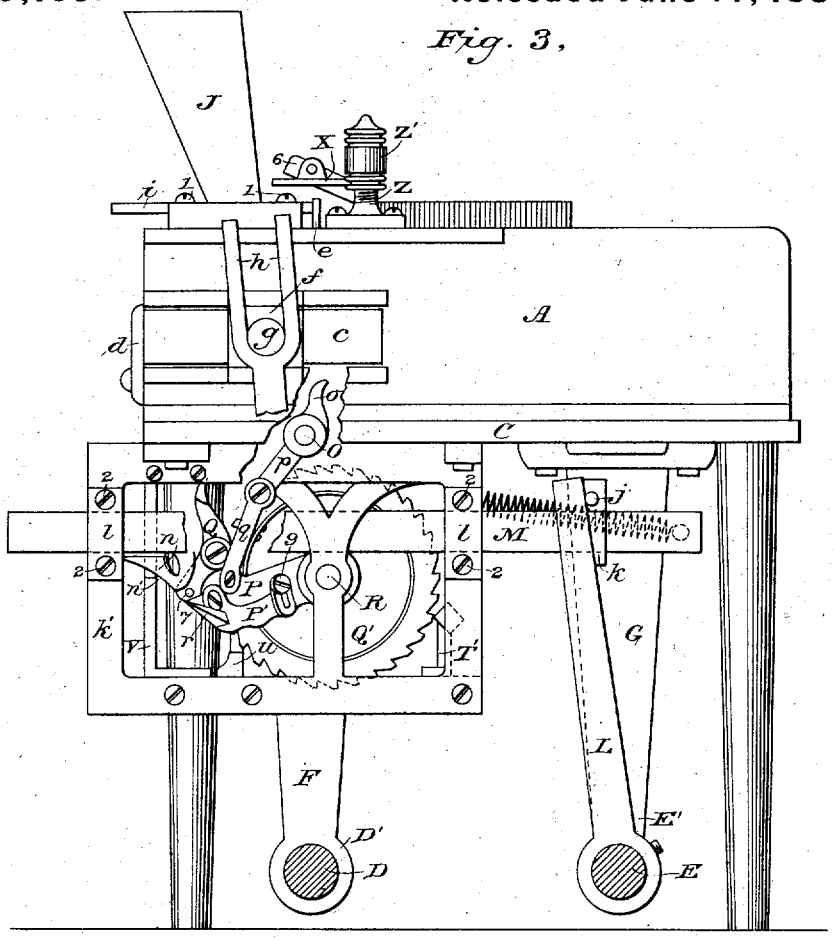
*Fig. 7,*
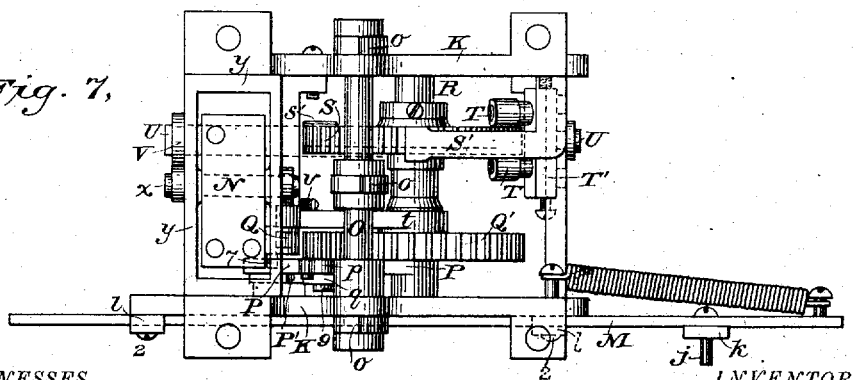
WITNESSES
Wm A. Skinkle.
Geo W. Breck.
INVENTOR
Abram A. Rheutan,
By his Attorneys
Baldwin, Hopkins & Peyton.

A. A. RHEUTAN,
Assignor to W. H. HILL.
Envelope Machine.
No. 9,755. Reissued June 14, 1881.
Fig. 4,
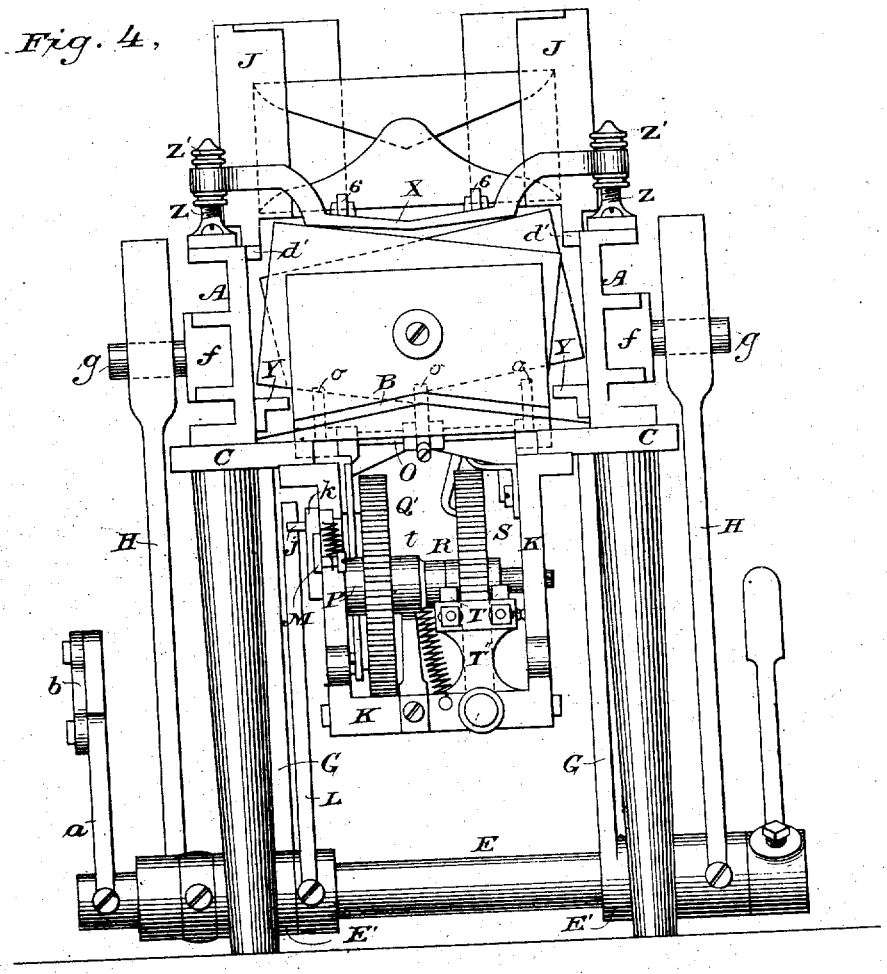
WITNESSES
Wm. A. Skinkle.
Geo. W. Breck.
INVENTOR
Abram A. Rheutan,
By his Attorneys
Baldwin, Hopkins, & Peyton.

UNITED STATES PATENT OFFICE.

ABRAM A. RHEUTAN, OF WORCESTER, MASSACHUSETTS, ASSIGNOR TO WADE H. HILL, OF SAME PLACE.

ENVELOPE-MACHINE.

SPECIFICATION forming part of Reissued Letters Patent No. 9,755, dated June 14, 1881.

Original No. 151,158, dated May 19, 1874. Application for reissue filed June 1, 1880

*To all whom it may concern:*

Be it known that I, ABRAM A. RHEUTAN, of the city and county of Worcester, and Commonwealth of Massachusetts, have invented a new and Improved Machine for Counting and Packing Envelopes, Papers, Cards, &c., and automatically arranging them in packages of the desired number; and I do hereby declare the following to be a full, clear, and exact description of the same, reference being had to the accompanying drawings, which form a part of this specification, and in which—

Figure 2:
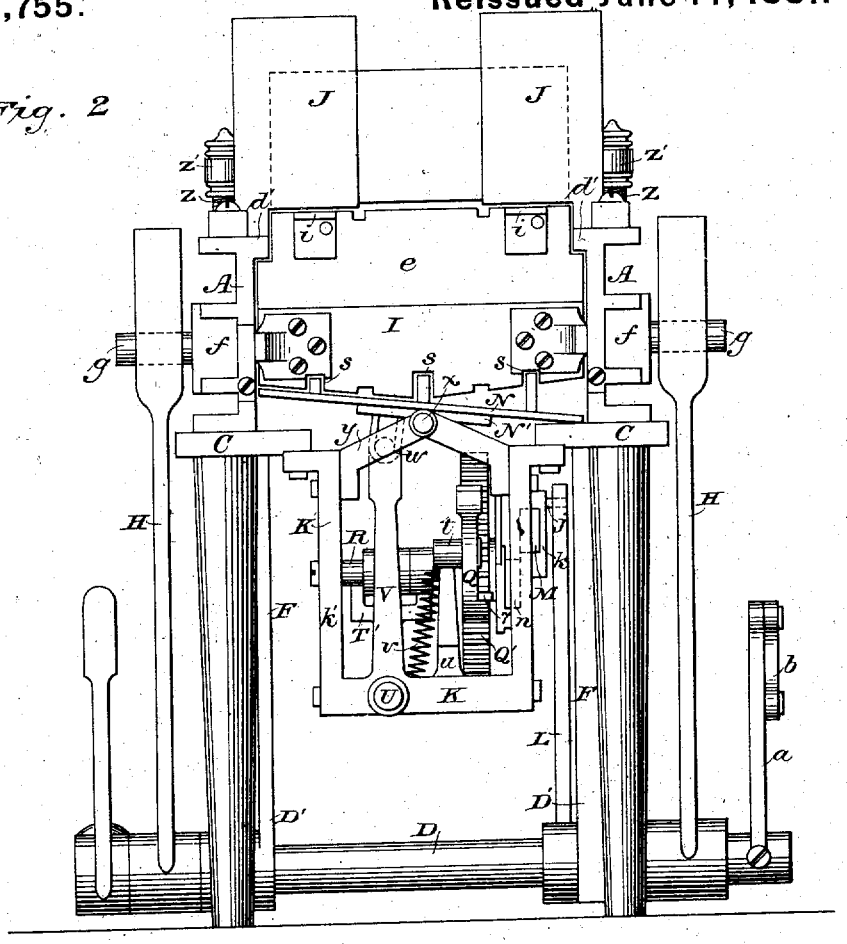
Figure 6:
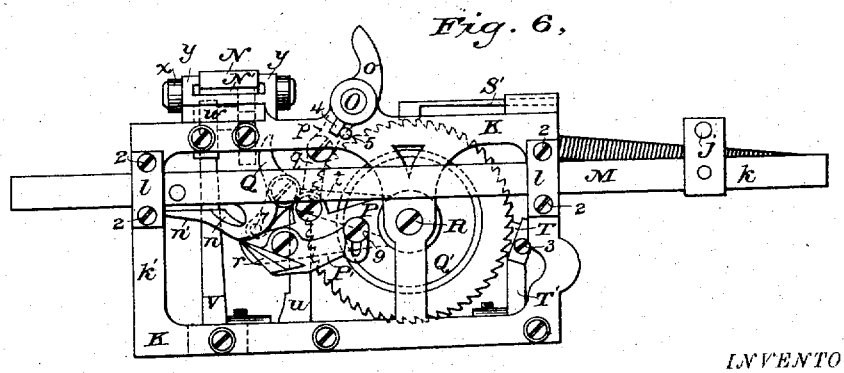

Figure 1 represents a top or plan view of the envelope-counting machine. Fig. 2 represents a back view. Fig. 3 represents a side view, with a portion of the side of the frame and some of the working parts broken away to show the operating parts of the counting mechanism more fully. Fig. 4 represents a front view. Fig. 5 represents a top or plan view of a portion of the doubly-inclined stationary bed-plate, tilting table, and certain other contiguous parts, which will be described more fully hereinafter. Fig. 6 represents a side view of the counting mechanism and frame which supports it detached from the main frame, and drawn upon an enlarged scale; and Fig. 7 represents a top or plan view of the parts shown in Fig. 6, with the tipping plate removed.

To enable those skilled in the art to which my invention belongs to make and use the same, I will proceed to describe it more in detail.

In the drawings, the parts marked A represent side pieces, which, with the doubly-inclined and convex table-plate B, form a box or receptacle for the envelopes, and which box rests on metal strips or pieces C. The latter strips or metal pieces C, in addition thereto, furnish support for attaching certain combined mechanism beneath the box just mentioned, and the said box may be secured on an ordinary wooden table or bench without the use of the supporting-legs shown in the drawings; or the table of an envelope-machine may be cut away and fitted to receive and support the pieces C C, with the working parts connected thereto.

D and E are shafts, fitted to rock in their respective sets of bearings D′ and E′ in the lower ends of the hangers F and G. Arms *a* *a* are secured to said shafts, and are united by a connecting link, bar, or rod, *b*, and the ends of one or both of said arms are to be provided with a series of holes, whereby link-bar *b* can be adjusted to give a greater or less rocking motion to shaft E and the counter operating lever or arm L, the lower end of which is securely fastened to shaft E. Shaft D is provided with a slotted arm or lever, H, projecting upward on each side of the main box or body part of the machine. Said slotted arms move a sliding carriage, I, of which the pusher-plate *e* forms a part, backward and forward in slot *c* of the side pieces, A, stops *d* preventing said carriage device from moving back farther than is necessary. Sliding carriage I consists of a pusher-plate, *e*, combined with and supported by sliding pieces *f*, the latter provided with pins *g*, working in the slots *h* of lever-arms H. To pusher-plate *e* are secured horizontal projecting arms or metal strips *i*, in the manner as shown in the drawings, Figs. 1 and 2.

Chutes J, of the form and pattern as shown, or of any other desirable form or pattern, are secured on the tops of side pieces, A, at the rear of the machine, by screws 1.

To metal strips or pieces C is attached a frame, K, of brass or other suitable material, combined with which is a counting device or mechanism, constructed and operating as follows:

The lower end of lever L being fastened to shaft E, when power is applied to rock-shaft D a similar motion is imparted to shaft E and its lever L, and at each forward motion of lever L its upper end comes in contact with a pin, *j*, projecting from a metal piece, *k*, secured or fastened to the side of a slide or draw bar, M, thereby moving the latter forward with every forward movement of the sliding carriage I, the said draw-bar sliding in slots formed by pieces *l*, secured by screws 2 to frame K.

Attached to the draw-bar M on its inner side, near its rear end, is a catch and stop piece, *n*, the lower inner side of which is provided with an incline piece, *n′*, whereby, when lever P is raised by an envelope, as will be hereinafter described, its inclined point *r* will be caught by the incline piece *n'* as slide-bar M moves forward, and the counting mechanism operated. Cams *o* are secured or fastened to a shaft, O, fitted to turn in proper bearings attached to frame K.

To shaft O is fastened a lever, *p*, which, in turn, is connected to lever P by means of the link-piece *q*, and the weight of lever P causes cams *o* to stand in the positions shown in Fig. 6 when they are not acted on by an envelope; and they are prevented from being drawn farther back by a stop-pin, 4, on the hub of one of the cams coming in contact with stop-pin 5, projecting from the side of frame K, as fully indicated in Fig. 6 of the drawings. Lever P is fitted to turn freely upon shaft R upon one side of the ratchet-wheel Q', while upon the opposite side of said ratchet-wheel a lever, *t*, is fitted to turn upon the same shaft, its front end resting upon the top of the stationary upright piece *u*, while to one side of the free end of said lever *t* is pivoted a pawl, Q, and from the lower end of which pawl projects a pin, 7, which rests upon the free end of lever P, as indicated in dotted lines, Fig. 6, whereby, when lever P is raised by the action of the envelope upon cams *o*, the upper end of pawl Q is thrown forward, and, entering one of the teeth in the ratchet-wheel, moves said ratchet-wheel Q' one tooth for each envelope. The upright piece *u* is made of such length that it supports lever *t* and pawl Q at such a height as respects the center of ratchet-wheel Q' that only one tooth of said ratchet-wheel can be caught by pawl Q at a time. The free end of lever *t* is held down by spiral spring *v*, one end of which spring is attached to lever *t* and the other end to a cross-piece of frame K, and the weight of pawl Q causes it to fall back whenever lever P is dropped from the incline *n'* by the backward motion of draw-bar M. It will be understood that as lever P is raised it acts upon pin 7, pawl Q, until the upper end of this pawl is thrown forward into one of the teeth of the ratchet-wheel Q', after which, as the end of lever P is still further raised by the forward motion of draw-bar M, both the pawl Q and lever *t*, to which it is pivoted, are raised sufficiently to turn the ratchet-wheel just one tooth and no more.

A cam-wheel, S, is secured to and turns with shaft R, upon which the ratchet-wheel Q' is also fastened. Said cam-wheel S turns between two rollers, T, the bearings of which are held securely in slots in said upright arm T' by means of nuts on their ends. The lower end of arm T' is fastened to shaft U. The journals of the rollers T can be adjusted to the cam-wheel S by means of two horizontal set-screws, 3, in the ends of the slotted part of the arm T', as indicated in the drawings. When the cam part *s'* of said cam-wheel S comes around to and in contact with said rollers, arm T partially turns or rocks shaft U, thus rocking arm V, fast on the other end of the same shaft. The upper end of arm V is slotted out to receive a stud, *w*, which is held securely in place by means of a nut on its end, while its projecting end works in a slotted piece forming a part of and projecting down from the bottom of the rocking piece N', to the upper side of which the tilting table or plate N is fastened, whereby every time shaft U is rocked in its bearings by means of cam *s'* table or plate N will be tilted or rocked to the right or left, as the case may be, to give the desired direction to the envelopes at the commencement of the counting of every new package, and in which inclined position it remains until the commencement of the counting of the next succeeding package, when it is tilted in an opposite direction, and the operation is thus continued while the machine is in operation. The rocking piece N', to which the tilting table or plate N is fastened, turns on a pivot or journal, *x*, supported and turning in proper bearings in the slotted or rectangular cross-piece *y* of frame K.

It will be understood that every time the cam-wheel S makes one entire revolution two packages of envelopes, of twenty-five each, will be counted and arranged upon different angles upon the ways Y and bed B, (see Fig. 4,) whereby the operator can take them from the front of the counting-machine in suitable packages without any danger of making a mistake.

The bottom edge or under side of the pusher-plate *e* of sliding carriage I is cut off on an incline from the center to the outer edges, so as to allow the said sliding carriage to operate without being impeded by the tilting plate in either of its inclined positions.

The cam-wheel S has fifty teeth or notches, to correspond with the fifty teeth of the ratchet-wheel Q' on the same shaft.

The rear end of a plate-spring, S', is fastened to the upper side of frame K, while its front end is provided with a finger fitted to enter the notches of the cam-wheel, thus preventing the revolution of the latter more than one tooth at a time, while at the same time it also prevents any accidental movement of the wheel and its shaft by the jarring motion of the machinery.

In front of chutes J are secured to the flanged tops of side pieces, A, upright screws or bolts Z, which are fitted with thumb-nuts Z', and between which the ends of the envelope-shield or guiding-plate X are held, and whereby said plate X can be adjusted up or down, as occasion may require. The ends of plate X are provided with holes sufficiently large to pass freely over the screws or bolts Z, and after one set of thumb-nuts have been screwed on, the shield-plate is placed in position, and then the other set of thumb-nuts are screwed on. The under side of plate X has a double-inclined and convex under surface, to correspond with the inclination of the upper edge of the envelopes as they are forced forward under it by the pusher-plate *e*. At a certain distance each side of the plate X is pivoted a stop, 6, corre-

BEST AVAILABLE COPY sponding with the stops *b b'* in the double-inclined bed or table B. The said system of stops are unequally poised or pivoted, and their ends are consequently thrown out of equilibrium, and those of the top plate, X, project below said plate, and the ends of the lower stops projecting upward, so that each envelope, as it pushes forward by the pusher-plate *e*, raises the downwardly-projecting ends of top-plate stops and depresses the upwardly-projecting ends of the lower system of stops, and after the envelope has passed these stops their own gravity causes them to assume their normal positions, thus preventing the envelopes from falling back, and also keeping them in an upright position in the pack, between said stop and weight Z, since the forward edges of the stops present vertical resisting-surfaces to any tendency of the envelopes to recede.

The tilting table N guides the edges of the alternate ends of the envelopes which form every other pack upon the respective ways Y, and as the ways Y continue to rise higher and higher above table B as they extend forward, the angles at which the separate packs of envelopes will stand increase in the same proportion as they are forced forward to the front end of the counting-machine, from whence the operator takes them.

It will be understood that the edges of the ends of the envelopes forming each alternate pack rest and slide upon opposite sides of table B.

The rear ends of side pieces, A, have flanges *d'*, which project in, so as to partly cover the rear ends of the ways Y, as indicated in Figs. 1, 2, 4, and 5. In the latter figure they are shown partly broken away. The rear ends of the ways Y are beveled off upon their inner edges, as shown in Fig. 5, and they are also arranged in inclined positions—that is, the left-hand way is inclined down to correspond with the bevel of the right-hand side of the bed B, while the right-hand way Y is inclined down to correspond with the bevel of the left-hand side of the bed B. The highest end of table N, when tilted in either direction, is designed to stand a little above the rear end of the way Y, upon which the edge of the envelope is to be guided. The inner flanges, *d'*, prevent the depressed end of the envelope from striking against the way Y when it is pushed from the tilting table N upon table B.

Instead of forming the free end of lever P with an incline point, *r*, said incline point may be made in a separate piece, P', and pivoted to the side of lever P, with its rear end slotted out, whereby a screw, 9, can be inserted for clamping the rear end of said piece to the side of lever P. By this mode of construction the incline point *r* can be adjusted up or down to give it a greater or less angle or inclination, as may be desired.

To make packages of different numbers it is only necessary to substitute ratchet-wheels and cam-wheels having a greater or less number of teeth. To prevent the machine counting when no envelopes have been deposited upon the table N, the lower edge of pusher-plate *e* is provided with slots *s*, whereby it can pass freely over cams *o* without operating the counting mechanism.

The rear point of the catch-piece *n* may be arranged to strike against frame-piece *k'*, and thus arrest the back motion of draw-bar M, as indicated in Figs. 3 and 6: or a pin may be inserted in the bar for that purpose.

For convenience of reaching the working parts of the counting mechanism the rear portion of convex bed B may be made in detachable sections, as shown in Fig. 5.

By the use of my counting-machine the serious objections to other modes adopted for counting envelopes by machinery connected directly with the moving parts of an envelope-machine are obviated, since by the use of my counting-machine no count will be made unless an envelope has been completed and deposited upon the tilting table; whereas by the modes adopted and used prior to my invention the counting mechanism was connected and driven directly by the main shaft of the envelope-machine, and a count went on, although by some accident or any other cause the machine failed to make and deliver envelopes.

Those skilled in the art of manufacturing and putting up envelopes will readily appreciate the great practical value and importance of my present improvements, since they enable the operator to put up the envelopes in packages of the desired number with perfect accuracy as regards the count, thus saving the manufacturer from great loss, inconvenience, and annoyance which result from the modes or counting envelopes previous to my present invention.

A reciprocating or rocking motion is to be communicated to the shaft D of the envelope-counting machine from a cam or crank on the main or other shaft of the envelope-folding machine. After the said envelope-machine has completed an envelope it is discharged into the chutes J of the counting-machine, the carriage I of which latter being so timed that the discharge will never take place until the carriage has moved sufficiently far forward to bring its arms under the chutes. The envelope remains in the chutes upon the arms *i* of the pusher-plate *e* until the carriage moves back, when it drops upon the tipping table N, and is carried forward by the next forward movement of the sliding-carriage and combined pusher-plate, and in being thus carried forward its lower edge comes in contact with cams *o*, thereby causing the operation of counting, as has heretofore been explained. Meanwhile the upper edge of said envelope rises and passes one of the stops 6, as the case may be, (according as it slides on either incline of the two inclines of the stationary plate B,) and the lower edge pushes down and passes over stop *b'* in the table B, and one, *a'*, in the metal way Y, attached to a side piece, A.

By having the envelope-supporting arms *i i* attached to the pusher-plate and projected back, as shown in the drawings, the envelope is delivered to the tilting table in an even manner, which would not be the case if the envelope were allowed to fall directly from the envelope-machine to the table, since the distance is considerable, and one end would be apt to be retarded by striking against the ends of the chutes. Then, again, the said arms are of great advantage in another respect, since the envelope can be dropped at any time while the arms are under the chutes, and this enables the pusher-plate to be run at an easy and much slower speed than would be the case if the pusher-plate had to be pushed forward and then suddenly withdrawn back of the chutes before the envelope fell.

The envelope-counting mechanism shown in the drawings represents one practical mode of carrying out my invention; but it will be understood that the same may be carried out by a modification of the parts without departing from the principle of operation.

Having described my improved envelope-counting machine, what I claim therein as new and of my invention, and desire to secure by Letters Patent, is—

1. In an envelope-counting machine, the combination of the cams O, the lever P, the pawl, and their connecting mechanism, substantially as described, whereby the operation of the cams and lever sets the pawl in position to operate the counting-wheel.

2. In an envelope-counting machine, the tilting table or plate N, operating substantially as and for the purpose set forth.

3. In an envelope-counting machine, the table or plate B, inclined upward from opposite edges to the middle, as shown, in combination with side pieces forming a receptacle for receiving and holding envelopes in oppositely-inclined positions, as set forth.

4. The combination of the envelope-feeding devices and the counting mechanism with the tilting table and double-inclined main or stationary table, whereby the envelopes, when moved forward by the feeding devices, are made to operate the counting mechanism to cause, at regular intervals, the reversal of the tilting table, and consequent division of the envelopes into packages or sets of uniform number, substantially as set forth.

5. The tilting table N, in combination with the main double-inclined table B, substantially as and for the purposes described.

6. In combination with the tilting table N and main double-inclined table B, the combined slide and pusher-plate I *e*, substantially as shown and set forth.

7. The combination, with chutes J, tilting table N, combined slide and pusher-plate I and *e*, of the sliding envelope-arms *i i*, substantially as and for the purposes set forth.

8. The combination, with the convex bed B and tilting table N, of the ways Y Y, substantially as and for the purposes set forth.

9. The adjustable shield and envelope guide-plate X, substantially as and for the purposes set forth.

10. The combination, with the adjustable shield and envelope guide-plate X, of the automatic stops 6, substantially as and for the purposes set forth.

11. The combination, with the pusher-plate *e*, tilting table N, and convex bed B, of the adjustable shield and envelope guide-plate X, and the automatic stops 6 and *c′ b′*, substantially as and for the purposes set forth.

12. The envelope-counting cams *o*, in combination with the tilting table N, main table B, and envelope pusher-plate, as shown and set forth.

13. The combination, with lever P and cams *o*, of arm *p* and link *q*, substantially as and for the purposes set forth.

14. The combination of the envelope-counting cams *o* with the lever P, and the pawl operated by said lever to engage with the draw-bar M, to effect the movement of the driving-wheel of counting-cam S, substantially as shown and set forth.

15. The combination, with cam-wheel S and tilting table N, and its supporting-frame N′, of frame T′, with its rolls T T, shaft U, and rocking arm V, substantially as and for the purposes set forth.

16. The lever P, having an inclined lug, *r*, in combination with the reciprocating draw-bar M, carrying the finger-piece *n*, having an inclined face, *n′*, for actuating the driving-wheel of the counting-cam S, substantially as shown and set forth.

17. The combination, with the sliding frame I, the reciprocating bar M, and the shafts D E, of the slotted arms G H, upright arms *a a′*, connecting-bar *b*, and rocking arms L.

18. The combination, with the catch-piece *n* and lever P, of the adjustable piece P′, with its incline point *r*, substantially as and for the purposes set forth.

19. In an envelope-counting machine, the combination, with the tilting plate N, of a counting-wheel and connecting mechanism operating the said plate two or more times during each of its revolutions, substantially as described.

20. The tilting table N, in combination with the envelope pusher-plate *e*, substantially as and for the purpose set forth.

21. The tilting table N, in combination with the ways Y Y, substantially as and for the purpose set forth.

22. The combination, with the envelope-counting cams *o*, of the tilting table N and the envelope pusher-plate *e*, substantially as and for the purpose set forth.

23. The combination of the pusher-plate *e*, the tilting table N, and the ways Y Y, substantially as and for the purpose set forth.

ABRAM A. RHEUTAN.

Witnesses:
J. HENRY TAYLOR,
P. H. CONDELL.